US012769763B2

(12) United States Patent
Werner et al.

(10) Patent No.: US 12,769,763 B2
(45) Date of Patent: *Oct. 20, 2026

(54) METHOD AND APPARATUS FOR MONITORING AN IN-MEMORY COMPUTER SYSTEM

(71) Applicant: SAP SE, Walldorf (DE)

(72) Inventors: Marc-Philip Werner, Walldorf (DE); Wolfgang Auer, Walldorf (DE)

(73) Assignee: SAP SE, Walldorf (DE)

( * ) Notice: Subject to any disclaimer, the term of this patent is extended or adjusted under 35 U.S.C. 154(b) by 22 days.

This patent is subject to a terminal disclaimer.

(21) Appl. No.: 18/507,552

(22) Filed: Nov. 13, 2023

(65) Prior Publication Data

US 2024/0086421 A1 Mar. 14, 2024

Related U.S. Application Data

(63) Continuation of application No. 17/236,264, filed on Apr. 21, 2021, now Pat. No. 11,868,373, which is a continuation of application No. 15/178,280, filed on Jun. 9, 2016, now Pat. No. 11,016,994, which is a (Continued)

(51) Int. Cl.

*G06F 16/21* (2019.01)
*G06F 11/34* (2006.01)
*G06F 16/22* (2019.01)
*G06F 16/23* (2019.01)

(Continued)

(52) U.S. Cl.

CPC ........ *G06F 16/283* (2019.01); *G06F 11/3476* (2013.01); *G06F 16/2282* (2019.01); *G06F 16/2379* (2019.01); *G06F 11/3072* (2013.01); *G06F 11/3409* (2013.01); *G06F 11/3452* (2013.01); *G06F 16/21* (2019.01)

(58) Field of Classification Search

None

See application file for complete search history.

(56) References Cited

U.S. PATENT DOCUMENTS 6,151,624 A 11/2000 Teare et al.
6,256,676 B1 7/2001 Taylor et al.
6,985,901 B1 1/2006 Sachse et al.

(Continued)

FOREIGN PATENT DOCUMENTS

EP 2040180 A1 3/2009
WO WO-2008091914 A1 * 7/2008 ............ G06Q 10/10

OTHER PUBLICATIONS

Ravikesh Chandra ; Improving application performance with hardware data structures; IEEE; pp. 1-4 (Year: 2010).*

(Continued)

*Primary Examiner* — Ann J Lo
*Assistant Examiner* — Jermaine A Mincey
(74) *Attorney, Agent, or Firm* — Fountainhead Law Group, PC

(57) ABSTRACT

An in-memory computing system for conducting on-line transaction processing and on-line analytical processing includes system tables in main memory to store runtime information. A statistics service can access the runtime information using script procedures stored in the main memory to collect monitoring data, generate historical data, and other system performance metrics while maintaining the runtime data and generated data in the main memory.

20 Claims, 11 Drawing Sheets

Related U.S. Application Data continuation of application No. 14/243,567, filed on Apr. 2, 2014, now Pat. No. 9,389,982.

(60) Provisional application No. 61/908,616, filed on Nov. 25, 2013.

(51) Int. Cl.
*G06F 16/28* (2019.01)
*G06F 11/30* (2006.01)

(56) References Cited

U.S. PATENT DOCUMENTS

| | | | |
|---|---|---|---|
| 7,117,249 B1 | 10/2006 | Kitamura et al. | |
| 7,403,942 B1 | 7/2008 | Bayliss | |
| 7,567,257 B2 | 7/2009 | Antoch et al. | |
| 7,577,731 B2 | 8/2009 | Frey et al. | |
| 7,664,847 B2 | 2/2010 | Colrain et al. | |
| 7,774,312 B2 | 8/2010 | Ngai et al. | |
| 7,945,909 B2 | 5/2011 | Mariotti et al. | |
| 8,027,972 B2 | 9/2011 | Barsness et al. | |
| 8,095,512 B2 | 1/2012 | Barsness et al. | |
| 8,166,152 B1 | 4/2012 | Delcheva et al. | |
| 8,170,981 B1 | 5/2012 | Tewksbary | |
| 8,214,329 B2 | 7/2012 | Gilder et al. | |
| 8,375,047 B2 | 2/2013 | Narayanan et al. | |
| 8,386,639 B1 | 2/2013 | Galvin | |
| 8,510,807 B1 | 8/2013 | Elazary et al. | |
| 8,572,226 B2 | 10/2013 | Moser | |
| 8,600,955 B2 | 12/2013 | Werner | |
| 8,977,600 B2 | 3/2015 | Crupi et al. | |
| 9,116,973 B2 | 8/2015 | Werner | |
| 9,183,529 B2 | 11/2015 | Gluzman Peregrine et al. | |
| 9,218,373 B2 | 12/2015 | Saito et al. | |
| 9,639,595 B2 | 5/2017 | Appanna et al. | |
| 9,740,741 B2 | 8/2017 | Plattner et al. | |
| 10,042,910 B2 | 8/2018 | Bensberg et al. | |
| 2002/0029209 A1 | 3/2002 | Bernal et al. | |
| 2002/0049744 A1 | 4/2002 | Nakos et al. | |
| 2003/0220860 A1* | 11/2003 | Heytens | G06Q 30/0201 705/7.29 |
| 2005/0131924 A1 | 6/2005 | Jones | |
| 2006/0143034 A1 | 6/2006 | Rothermel et al. | |
| 2007/0162501 A1 | 7/2007 | Agassi et al. | |
| 2007/0203933 A1 | 8/2007 | Iversen et al. | |
| 2007/0250538 A1 | 10/2007 | Moore | |
| 2009/0083276 A1 | 3/2009 | Barsness et al. | |
| 2009/0164443 A1 | 6/2009 | Ramos et al. | |
| 2009/0234710 A1 | 9/2009 | Belgaied Hassine et al. | |
| 2009/0240663 A1 | 9/2009 | Plattner et al. | |
| 2010/0217550 A1 | 8/2010 | Crabtree et al. | |
| 2010/0217651 A1 | 8/2010 | Crabtree et al. | |
| 2011/0246281 A1 | 10/2011 | Satyavolu et al. | |
| 2012/0084274 A1 | 4/2012 | Renkes et al. | |
| 2012/0084278 A1 | 4/2012 | Franke et al. | |
| 2012/0109936 A1 | 5/2012 | Zhang et al. | |
| 2012/0150791 A1 | 6/2012 | Willson | |
| 2012/0191642 A1 | 7/2012 | George | |
| 2012/0265725 A1 | 10/2012 | Werner | |
| 2012/0311295 A1 | 12/2012 | Gaur et al. | |
| 2013/0073513 A1* | 3/2013 | Kemper | G06F 16/28 707/600 |
| 2013/0110614 A1 | 5/2013 | Wagner et al. | |
| 2013/0226959 A1 | 8/2013 | Dittrich et al. | |
| 2014/0114970 A1 | 4/2014 | Prabu et al. | |
| 2014/0365533 A1 | 12/2014 | Debray et al. | |
| 2015/0014940 A1 | 1/2015 | Hoehle et al. | |
| 2015/0074037 A1 | 3/2015 | Sarferaz | |
| 2021/0240736 A1 | 8/2021 | Werner et al. | |

OTHER PUBLICATIONS

Anonymous Oracle Times Ten In-Memory Database PL/SQL Packages Reference, May 2013, 348 pages.
Bernardo Damele; Advanced SOL injection to operating system full control; 2009; pp. 1-37 (Year: 2009).
Christiam Camacho; "BLAST+: architecture and applications"; 2009; BMC Bioninformatics; pp. 1-9 (Year: 2009).
Christopher Denni; On-the-fly Composition of FPGA-Based SOL Query Accelerators Using A Partially Reconfigurable Module Library; IEEE; 2012; pp. 45-52 (Year: 2012).
Hasso Plattner, "A Common Database Approach for OLTP and OLAP Using an In-Memory Column Database," SIGMOD'09, Jun. 29-Jul. 2, 2009.
Jens Krueger et al., "Data Structures for Mixed Workloads in In-Memory Databases," 2010 5th International Conference on Computer Sciences and Convergence Information, Dec. 2010.
Lee "A Performance Anomaly Detection and Analysis Framework for DBMS Development", IEEE Transactions on Knowledge and Data Engineering, vol. 24, Issue 8, Mar. 28, 2011, 16 pages.

* cited by examiner

500

| SNAPSHOT_ID | DATA_SEQ | SERVER_TIMESTAMP | FREE_PHYSICAL_MEMORY (501) | FREE_SWAP_SPACE (502) | HOST (503) | TOTAL_CPU_IDLE_TIME (504) | TOTAL_CPU_SYSTEM_TIME (505) |
|---|---|---|---|---|---|---|---|
| 05.04.2011 10:45:46.000 | 0 | 05.04.2011 12:45:46.000 | 3.770.265.600 | 9.128.984.576 | wdfd00252619a | 149.050.937 | 2.592.830 |
| 05.04.2011 10:46:46.000 | 0 | 05.04.2011 12:46:46.000 | 3.547.852.800 | 9.095.061.504 | wdfd00252619a | 149.703.489 | 2.623.156 |
| 05.04.2011 10:47:46.000 | 0 | 05.04.2011 12:47:46.000 | 2.985.103.360 | 9.817.214.976 | wdfd00252619a | 150.358.677 | 2.651.985 |
| 05.04.2011 10:48:46.000 | 0 | 05.04.2011 12:48:46.000 | 3.697.127.424 | 9.111.109.632 | wdfd00252619a | 151.014.334 | 2.680.159 |
| 05.04.2011 10:49:46.000 | 0 | 05.04.2011 12:49:46.000 | 3.536.580.608 | 9.050.984.448 | wdfd00252619a | 151.672.502 | 2.705.915 |
| 05.04.2011 10:50:46.000 | 0 | 05.04.2011 12:50:46.000 | 3.612.774.400 | 9.106.755.584 | wdfd00252619a | 152.330.577 | 2.727.864 |
| 05.04.2011 10:51:46.000 | 0 | 05.04.2011 12:51:46.000 | 3.869.777.920 | 9.154.220.032 | wdfd00252619a | 152.985.984 | 2.751.015 |
| 05.04.2011 10:52:46.000 | 0 | 05.04.2011 12:52:46.000 | 3.829.293.056 | 9.214.926.848 | wdfd00252619a | 153.640.938 | 2.770.998 |
| 05.04.2011 10:53:46.000 | 0 | 05.04.2011 12:53:46.000 | 3.790.553.088 | 9.177.067.520 | wdfd00252619a | 154.292.118 | 2.801.372 |
| 05.04.2011 10:54:46.000 | 0 | 05.04.2011 12:54:46.000 | 3.743.862.784 | 9.167.245.312 | wdfd00252619a | 154.943.001 | 2.824.210 |
| 05.04.2011 10:55:46.000 | 0 | 05.04.2011 12:55:46.000 | 3.617.513.472 | 9.179.500.544 | wdfd00252619a | 155.595.678 | 2.845.848 |
| 05.04.2011 10:56:46.000 | 0 | 05.04.2011 12:56:46.000 | 3.701.305.344 | 9.188.777.984 | wdfd00252619a | 156.249.244 | 2.869.263 |
| 05.04.2011 10:57:46.000 | 0 | 05.04.2011 12:57:46.000 | 3.764.166.656 | 9.196.949.504 | wdfd00252619a | 156.903.309 | 2.891.197 |
| 05.04.2011 10:58:46.000 | 0 | 05.04.2011 12:58:46.000 | 3.767.025.664 | 9.201.721.344 | wdfd00252619a | 157.558.841 | 2.913.443 |
| 05.04.2011 10:59:46.000 | 0 | 05.04.2011 12:59:46.000 | 3.782.119.424 | 9.195.139.072 | wdfd00252619a | 158.216.058 | 2.934.612 |
| 05.04.2011 11:00:46.000 | 0 | 05.04.2011 13:00:46.000 | 3.730.595.840 | 9.208.270.848 | wdfd00252619a | 158.873.664 | 2.957.466 |
| 05.04.2011 11:01:46.000 | 0 | 05.04.2011 13:01:46.000 | 3.796.168.704 | 9.223.962.624 | wdfd00252619a | 159.530.382 | 2.978.043 |
| 05.04.2011 11:02:46.000 | 0 | 05.04.2011 13:02:46.000 | 3.798.478.848 | 9.210.261.504 | wdfd00252619a | 160.185.867 | 2.999.431 |
| 05.04.2011 11:03:46.000 | 0 | 05.04.2011 13:03:46.000 | 3.742.044.160 | 9.195.474.944 | wdfd00252619a | 160.841.976 | 3.023.626 |
| 05.04.2011 11:04:46.000 | 0 | 05.04.2011 13:04:46.000 | 3.584.876.544 | 9.157.582.848 | wdfd00252619a | 161.483.327 | 3.047.931 |

Fig. 5A

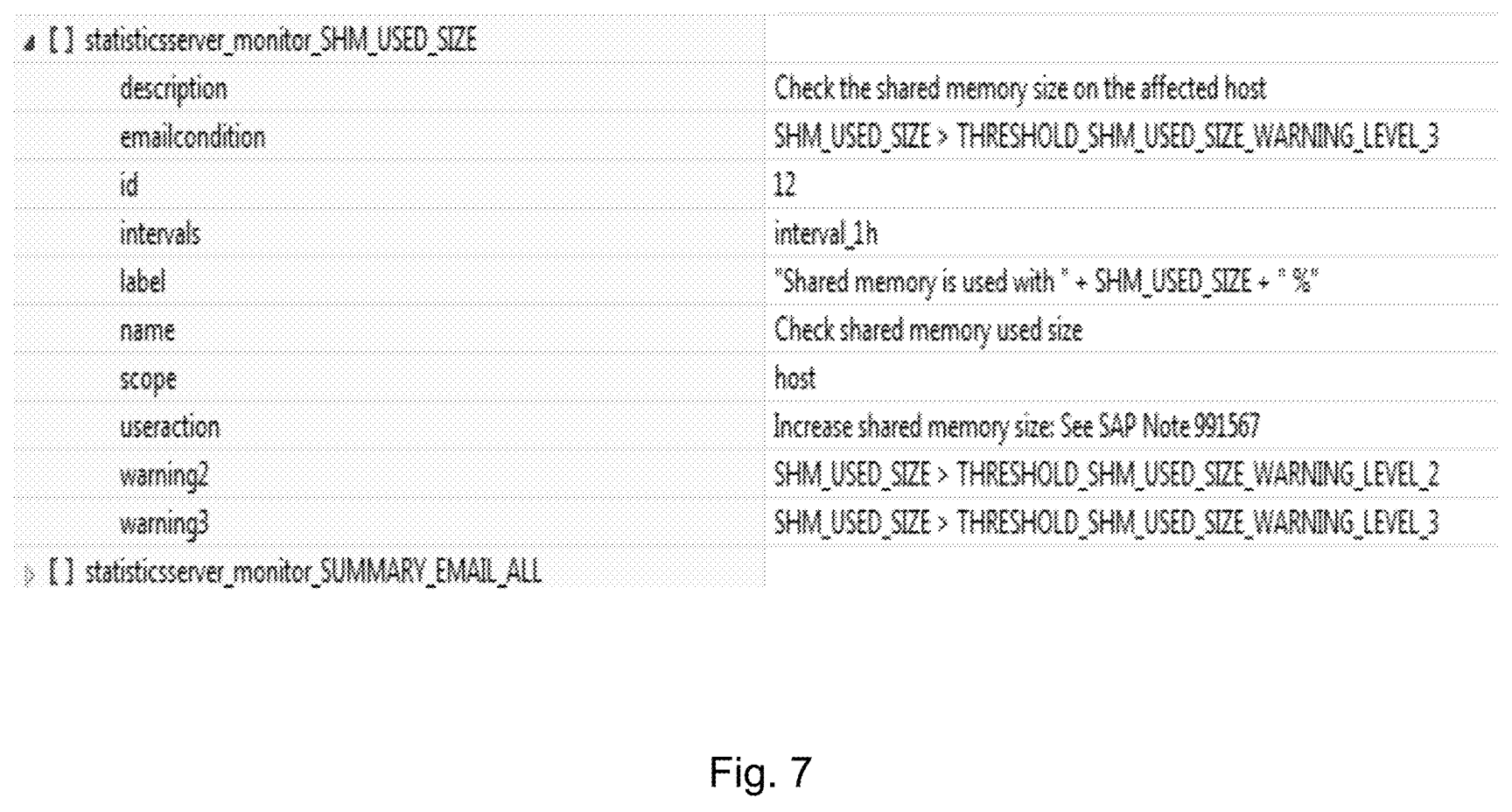

| | |
|---|---|
| [ ] statisticsserver_monitor_SHM_USED_SIZE | |
| description | Check the shared memory size on the affected host |
| emailcondition | SHM_USED_SIZE > THRESHOLD_SHM_USED_SIZE_WARNING_LEVEL_3 |
| id | 12 |
| intervals | interval_1h |
| label | "Shared memory is used with " + SHM_USED_SIZE + " %" |
| name | Check shared memory used size |
| scope | host |
| useraction | Increase shared memory size: See SAP Note 991567 |
| warning2 | SHM_USED_SIZE > THRESHOLD_SHM_USED_SIZE_WARNING_LEVEL_2 |
| warning3 | SHM_USED_SIZE > THRESHOLD_SHM_USED_SIZE_WARNING_LEVEL_3 |
| [ ] statisticsserver_monitor_SUMMARY_EMAIL_ALL | |

Fig. 7

METHOD AND APPARATUS FOR MONITORING AN IN-MEMORY COMPUTER SYSTEM

CROSS REFERENCE TO RELATED APPLICATIONS

This application is a continuation of U.S. patent application Ser. No. 17/236,264 for "Method and Apparatus for Monitoring an In-memory Computer System" filed Apr. 21, 2021, which is a continuation of U.S. patent application Ser. No. 15/178,280 for "System for Performing On-Line Transaction Processing and On-Line Analytical Processing on Runtime Data" filed Jun. 9, 2016, now U.S. Pat. No. 11,016,994, which is a continuation of U.S. patent application Ser. No. 14/243,567 for "Method and Apparatus for Monitoring an In-memory Computer System" filed Apr. 2, 2014, now U.S. Pat. No. 9,389,982, which claims the benefit of U.S. Provisional Patent Application No. 61/908,616 filed Nov. 25, 2013, which is related to U.S. patent application Ser. No. 13/088,921 filed Apr. 18, 2011, now U.S. Pat. No. 8,600,955; all of which are incorporated by reference herein.

BACKGROUND

The present disclosure relates generally to computer systems and in particular to in-system monitoring of multiprocessor computer systems.

Unless otherwise indicated herein, the approaches described in this section are not prior art to the claims in this application and are not admitted to be prior art by inclusion in this section.

A typical business enterprise comprises a large number of organizations (marketing, engineering, production, supply, sales, customer service, and so on). Large volumes of data are typically generated and collected by these many organizations.

Business intelligence (BI) and business warehousing (BW) tools conventionally are built on a database architecture where the data is collected and stored onto disk storage systems and subsequently read from disks (e.g., hard disk drive units) comprising the disk storage system for analysis. Conventional architectures also separate the function of transaction processing and analytical processing.

On-line transaction processing (OLTP) is typically characterized by a large number of short on-line transactions (INSERT, UPDATE, DELETE). OLTP systems in an enterprise are the source of data for the rest of the enterprise. Various organizations in an enterprise typically connect to an OLTP to record their activities. For example, a manufacturing group may connect to an OLTP system to input data into a manufacturing database such as incoming parts, production units, tracking of defects, and so on. A sales department may connect to an OLTP system to input data to a sales database.

On-line analytical processing (OLAP), by comparison, constitute a user of the data collected and stored in OLTP systems. Whereas OLTP may be viewed as a collector of raw data, OLAP may be viewed as a user of the raw data. OLAP queries are often complex and involve aggregations of the data stored in one or more OLTP databases. An OLAP database typically stores aggregated, historical data. OLAP is typically characterized by a lower volume of transactions as compared to OLTP.

There is always huge demand for real-time reporting that can leverage real-time data and provide improved decision making capability by reporting from transactional and operational systems. The success of a business may depend on how quick a reliable and smart decision can be made based on information available at that moment. Real-time computing systems have been evolving to meet these needs. One such system is based on an architecture known as in-memory computing.

In-memory computing can parse and analyze data in a matter of minutes to seconds as compared to conventional computing architectures which may require days to weeks. In-computing architectures are highly integrated systems. Maintaining and otherwise supporting such systems require equally fast response times to detect and assess changes in the system that may degrade performance.

These and other issues are addressed by embodiments of the disclosure, individually and collectively.

SUMMARY

A method and apparatus for monitoring an in-memory computer system includes performing on-line transaction processing and on-line analytical processing in the in-memory computer system. Results of the processing may be stored in main memory of the in-memory computer system. Runtime information relating to the on-line transaction processing and on-line analytical processing may be stored in system tables in the main memory. Information from the system tables can be copied as monitoring data by executing one or more script procedures stored in the main memory.

In embodiments, executing script procedures in the main memory can perform data analysis on the monitoring data in the system tables to generate a plurality of system performance metrics.

In at least certain embodiments, the script procedures can be executed in the main memory to evaluate the monitoring data according to alert condition definitions and to write one or more alerts to alert tables stored in the main memory when an alert condition is detected.

The following detailed description and accompanying drawings provide a better understanding of the nature and advantages of the present disclosure.

BRIEF DESCRIPTION OF THE DRAWINGS

FIG. 5A shows an instantiation of the data table defined in FIG. 5.

FIG. 7 is an example of an array definition for alerts.

DETAILED DESCRIPTION

Described herein are embodiments for in-system monitoring of in-memory computing architectures. In the following descriptions, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
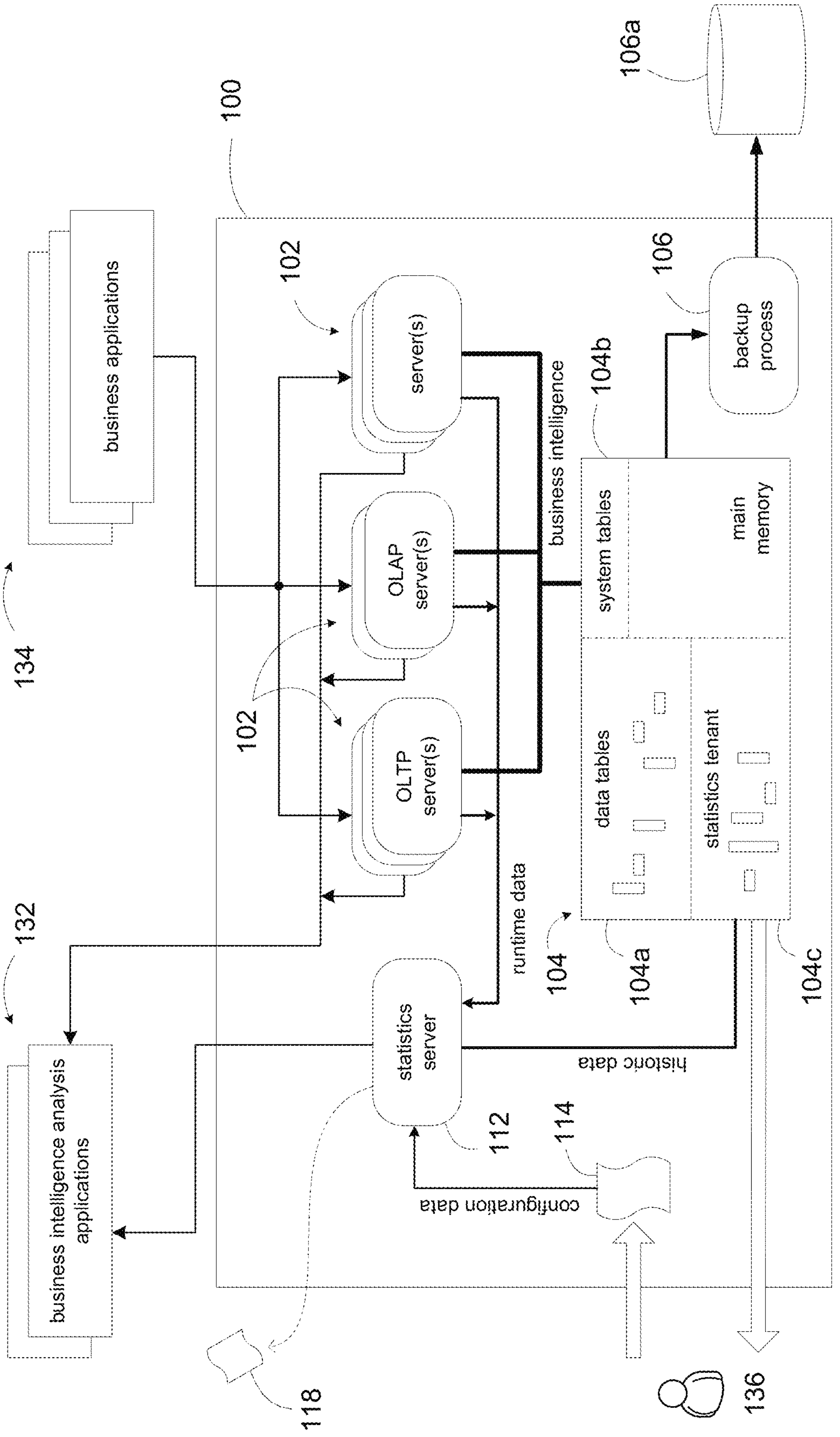
FIG. 1 is a block diagram of an in-memory computing system in accordance with the present disclosure.

With reference to FIG. 1, in embodiments of the present disclosure an in-memory computing system 100 for an organization can be interfaced with various business tools of that organization. One class of business tools is business applications 134 used by the various operating groups in the organization. Business applications 134 can communicate with the in-memory computing system 100 to serve as a repository for the data generated by those operating groups. Typical business applications that the operating groups execute include applications such as PLM (product lifecycle management), CRM (customer relationship management), PPS (product production system), ERP (enterprise resource planning), and so on. These applications typically generate data (referred to as "transaction data") that can be stored in the in-memory computing system. For example, transaction data may be information relating to the sale of widgets such as where the sale occurred, when the sale took place, the sale price, and so on. Transaction data may be information about the production of widgets such as how many widgets were produced at a given manufacturing site, information about the raw materials used to make the widgets and so on.

Another class of business tools is business intelligence (BI) analysis applications 132 (also referred to a BI tools). This class of business tools typically provides historical, current, and predictive views of business operations. BI analysis applications 132 play an important role in the strategic planning process of the organization. These applications treat the collected and analyzed data as business intelligence in the areas of customer profiling, customer support, market research, market segmentation, product profitability, statistical analysis, and inventory and distribution analysis, production and manufacturing tracking, and so on in order to aid in the decision making process. Common functions include reporting, online analytical processing, analytics, data mining, business performance management, benchmarking, text mining and predictive analytics, and so on. BI analysis applications 132 can communicate with the in-memory computing system 100 to access the data provided by the business applications 134 and data generated from analyses conducted on the "raw" data provided by the business applications.

Figure 2:
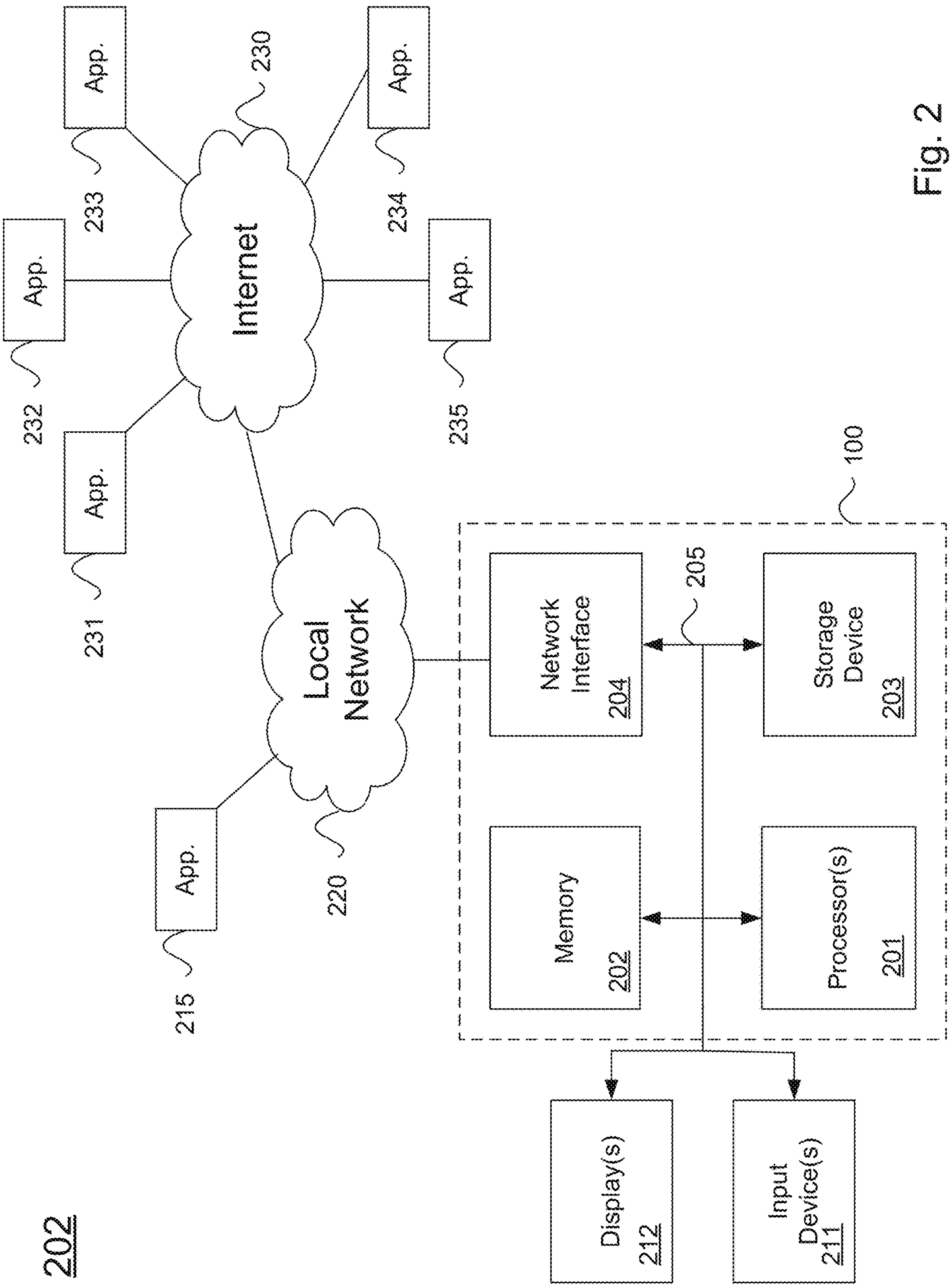
FIG. 2 represents a high level system diagram of an in-memory computing system in accordance with the present disclosure.

Referring to FIG. 2 for a moment, a system level block diagram illustrates a typical arrangement of embodiments of the present disclosure. Applications 215 and 231-235 represent instantiations of the business tool 132, 134. The applications 215 and 231-235 may communicate with the in-memory computing system 100 in any of a number of ways. A common configuration is IP (internet protocol) based communication. For example, applications 215 may operate locally within a local area network 220. The in-memory computing system 100 may be locally connected on the local area network 220. Other applications 231-235 may be located outside of the local network can communicate with the in-memory computing system 100 over a suitable communication system such as the Internet 230.

In embodiments, the in-memory computing system 100 may include a data processor subsystem 201 comprising a plurality of data processing units. A main memory subsystem 202 may comprise various forms of read/write random access memory, including volatile memory such as DRAM and non-volatile memory such as FLASH memory, and so on. The main memory subsystem 202 may also include read-only type memory such as ROM memory. A distinction between main memory and disk-based memory is the former does not require disk seek operations (e.g., rotating a disk, moving a read/write head into position, etc.) and thus can access data significantly more quickly.

The in-memory computing system 100 is a computing architecture in which data is moved off disk storage and into main memory, thus avoiding the need (and delay) to run disk-seek operations each time a data look-up is performed. As can be appreciated, this approach significantly increases performance. For example, the tables comprising a database can be stored in main memory (e.g., RAM, flash memory, and the like) as opposed to disk storage such as hard disk drives, thus increasing data look-up performance.

To further improve data look-up speed, data tables in the in-computing system 100 can be stored in column-oriented fashion, rather than row-oriented. For example, a customer record might have name, store location, purchased item, and price as relevant fields (four fields). A table of such customer records might have the following data:

| name | store | item | price |
|---|---|---|---|
| John | S1 | shoes | 100 |
| Joe | S4 | book | 20 |
| Mary | S1 | pens | 10 |
| Sam | S2 | paper | 50 |
| Dale | S2 | shirts | 45 |

In a row-oriented storage scheme, the data comprising the table would be stored in continuous locations in main memory or on disk in the following sequence:

John S1 shoes 100 Joe S4 book 20 Mary S1 pens 10 Sam S2 paper 50 Dale S2 shirts 45

In a column-oriented storage scheme, the data would be stored in the following sequence:

John Joe Mary Sam Dale S1 S4 S1 S2 S2 shoes book pens paper shirts 100 20 10 50 45

Where analytical processing that requires the computation of aggregate calculations constitutes a major component of the workload in the in-computing system 100, column-oriented storage would be advantageous because it is more efficient to perform aggregate operations on data (e.g. summing of data) when the data is stored in sequential memory locations.

The in-memory computing system 100 may nonetheless include a storage subsystem 203 comprising one or more mass storage devices such as hard disk drives and the like, to store the operating system, administrative information (e.g., login accounts), and the like. A network interface subsystem 204 can provide communication between the in-memory computer system 100 and applications 215 and 231-235 over various electronic communication media and protocols. In one embodiment, the network interface subsystem 204 can include functionality to communicate over a telecommunication network. A system of buses 205 can interconnect the foregoing subsystems, providing control lines, data lines, and/or voltage supply lines to/from the various subsystems. The in-memory computer system 100 may include a suitable display(s) 212 and input devices 211 such as a keyboard and a mouse input device.

Returning to FIG. 1, in embodiments, the in-memory computer system 100 includes various processes 102 (e.g., executed by the data processing units 201) in communication with the business tools 132, 134. For example, the business applications 134 may provide data collected during the daily operations of the organization that would be stored in the in-memory computing system 100. For example, a CRM business application may generate customer support data. A PPS business application may generate information about suppliers of parts, and so on.

Accordingly, one or more on-line transaction processing (OLTP) servers executing on the in-memory computing system 100 can communicate with the business applications 134 to receive data from those applications; e.g., customer purchases, manufacturing logs, telemarketing data, and so on. As explained above, the in-memory computing system 100 stores received data in main memory 104 rather than on disk storage devices in order to realize improvements in data access speed by avoiding data seek operations required of disk storage devices. Accordingly, the OLTP servers may store data received from business applications 134 into tables 104*a* that are memory resident (as opposed to disk resident).

One or more on-line analytical process (OLAP) servers can access the data stored in the data tables 104*a* to analyze the data in the data tables to provide insight into the organization's business and to facilitate planning of various operations such as manufacturing, marketing, customer support and so on. The OLAP servers may receive data directly from the business applications 134 as well as access the data tables 104*a* to perform various analyses. Results produced by the one or more OLAP process servers may include reports, new data tables for data mining, and so on. Such results can be stored back into main memory 104 for subsequent access and further analysis. Storing the results back into main memory 104 allows for quick access to the results without the delays of disk storage devices.

Additional servers may be provided in the in-memory computing system 100, for example, to support the operations of the OLTP servers and the OLAP servers. In some embodiments, an additional server can be used to schedule or trigger operations performed on data in the main memory 104.

Though the collected and analyzed data may be stored in main memory 104 for performance reasons, the in-memory computing system 100 may nonetheless include a suitable backup or remote storage system in order to provide permanent storage of the data. For example, a backup process 106 may execute in the in-memory computing system 100 to read out data stored in main memory 104 to be stored in a backup storage system 106*a*. The backup storage system 106*a* may be co-located with the in-memory computing system 100, or may be remotely located (e.g., in a different geographic location).

The business intelligence analysis applications 132 can communicate with the OLTP servers and the OLAP servers to access the "raw" data produced by the business applications 134 and collected by the OLTP servers, and to access analyzed results produced by the OLAP servers in order to provide planners in the organization with information for making decisions. For example, business intelligence analysis applications 132 can include a wide range of tool such as financial analysis, statistical process control, and so on. Business intelligence analysis applications 132 may be used to spot trends, identify patterns, interpret outliers, uncover unexpected relationships within the raw data collected by the OLTP servers, and the like. Business intelligence analysis applications 132 may collect results from or otherwise interact with OLAP servers to create reports such as sales forecasts, manufacturing requirements, and so on.

In embodiments, the in-memory computing system 100 may include a statistics server process 112 executed by the data processor subsystem 201 (FIG. 2). The statistics server 112 can communicate with the other servers 102, for example, via a suitable inter-process communication protocol. The statistics server 112 can collect runtime information as monitoring data from processes 102 executing in the in-memory computing system 100. In embodiments, runtime information can be collected from the operating system (OS) as well.

Runtime information may include state information about the state of a process 102. Run time information may include state information about the in-memory computing system 100 itself. For example, state information may include system information relating to the components of the in-memory computing system 100 such as memory usage information, processor load data, information about other processes that are executing, users who might be logged on, information about the performance of the data processing unit of the data processing subsystem 201, memory access speed data, IP packet traffic, and so on. Such information may be collected by a system monitoring process having sufficient access (e.g., supervisory access) to the operating system (OS) tables and other OS level data.

State information may include process-specific information for each process 102. State information may include a process start time (if the process is a scheduled process), total run time, number of memory accesses, memory allocations made by the process, and so on. Runtime information can be generated by a process 102 to indicate the occurrence of events that might occur during execution of the process. For example, runtime information may include exception codes that a process 102 might generate as a result of encountering an error in the data (e.g., unexpected data format, illegal data value, etc.). An exception code may be generated by a process 102 if an error is detected with a data table that the process is accessing. An exception code may be generated if a process 102 did not have sufficient time to complete a task, and so on. Process-specific information may include data about how much data is collected by the process 102, how much data is generated by the process, etc. Such information can be collected by sub-routines within the process 102, or by process threads created (e.g., spawned, forked) by the process.

In embodiments, the runtime information can be stored in system tables 104*b* in the main memory 104 corresponding to each process 102. Some system tables 104*b* may be shared by two or more processes. In embodiments, the statistics server 112 can collect the runtime information by interrogating each process 102. The process 102 can then access the appropriate system table(s) 104*b* and provide the statistics server 112 with suitable responses. In embodiments, the statistics server 112 can collect the information from the system tables 104*b*. In an embodiment, the system tables 104*b* can be in the form of database tables. For example, the system tables 104*b* can be relational database tables accessed using an SQL query language.

The statistics server 112 can accumulate the collected data as historic data in a statistics tenant 104*c* in main memory 104 for a posteriori analysis. The statistics server 112 can perform analyses on the collected data to generate system performance metrics. For example, the statistics server 112 can produce a history of memory usage. Examples of performance metrics can include a history of processing times of the processes 102, responses to user requests, and so on.

Figure 3:
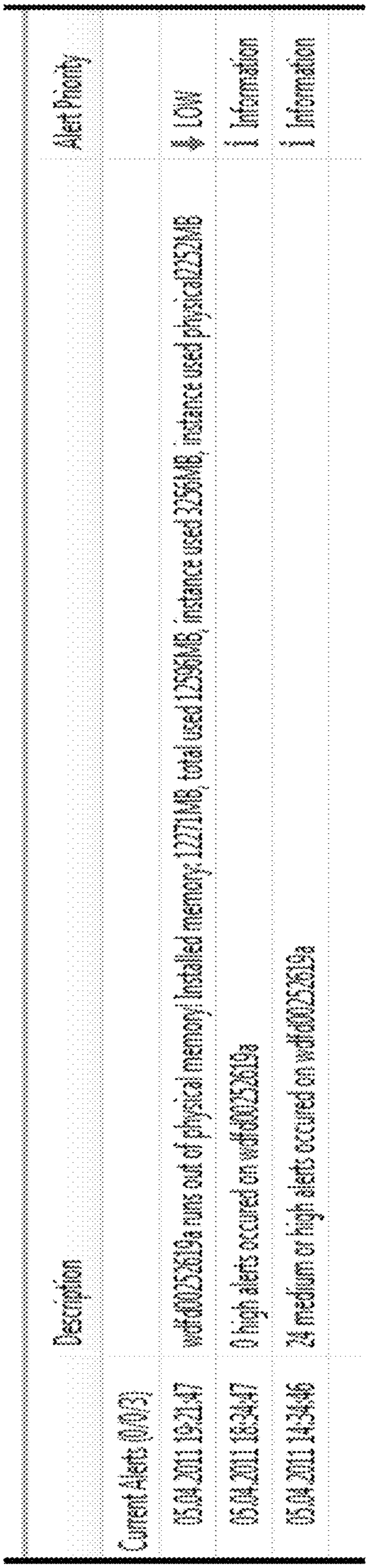
FIG. 3 illustrates an example of an alert in accordance with an embodiment.

A suitable user interface can be provided to allow a user 136 to query the historic data contained in the statistics tenant 104*c*. In embodiments, the user 136 can be notified with alerts to indicate the occurrence of events. For example, FIG. 3 illustrates a portion of a display of an alert that can be presented on a suitable display device.

Figure 4:
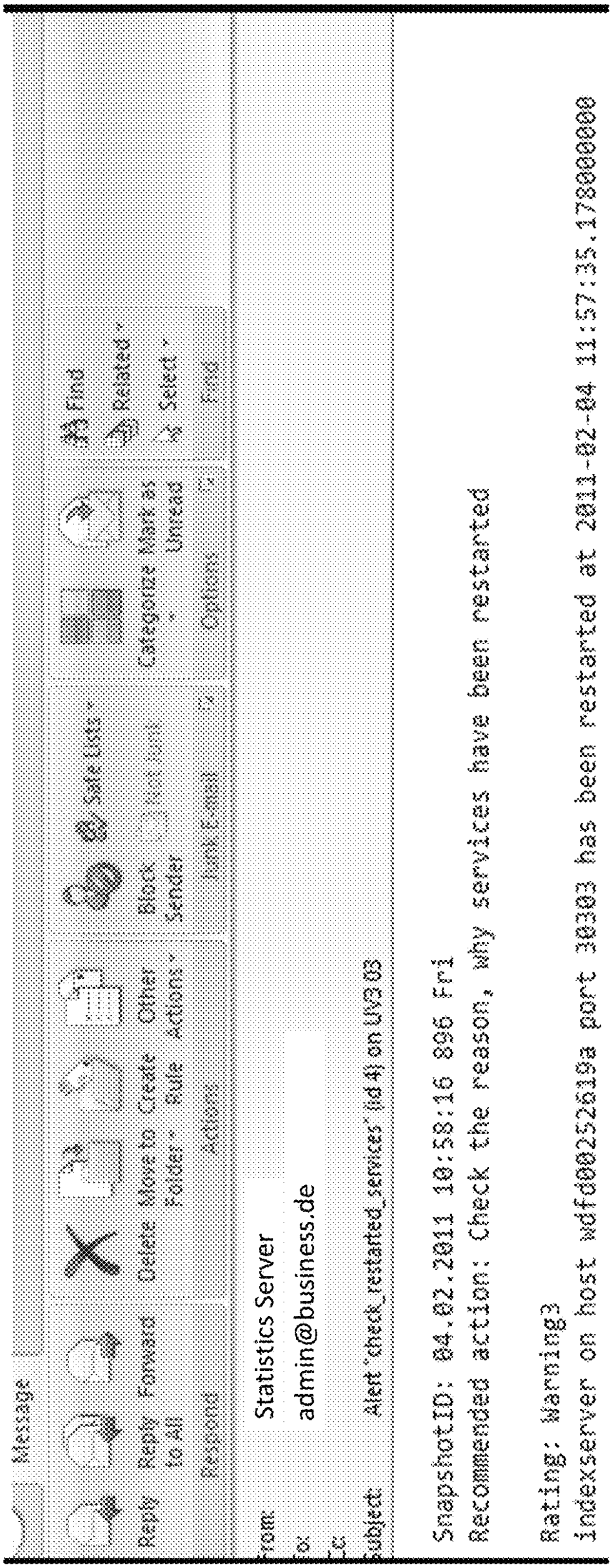
FIG. 4 illustrates an example of an alert that can be communicated.

In embodiments, the statistics server 112 can notify the user 136 of certain alerts 118, for example, if immediate action is required. Any suitable notification can serve as an alert 118. For example, referring to FIG. 4, the statistics server 112 can generate an email message that includes relevant information about the situation. Alert triggers can be specified by the user 136 to control when an alert 118 is communicated to the user. For example, available memory falling below 20% can be a criterion for sending an alert 118.

In embodiments, an external application can interface with the statistics server 112 to gather the historic data that has been collected by the statistics servers to conduct a more detailed analysis. For example, business intelligence analysis applications 132 are typically designed to analyze business data collected by the organization's various operations and make or facilitate strategic business decision-making activities. Accordingly, the same business intelligence analysis applications 132 may be adapted to identify underlying trends in the historic data and/or perform additional analyses on the historical and performance data to steer technical decisions regarding the performance of the in-computing system 100.

Consider a simple example: Suppose an organization has offices in Berlin and in California. Suppose a user in the Berlin office has scheduled a backup to take place each day at 00:30 AM. The statistics server 112 may collect information about the occurrence of backup processing happening each day at 00:30 AM (Berlin time). Suppose the statistics server 112 also collects data indicating slow response times of a process taking place in the California office at around 10 AM. These two apparently independent observations can be analyzed by a business intelligence analysis application 132. The business intelligence application 132 may consider the time difference between Berlin and California—Berlin is ahead of California by 9 or 10 hours, depending on the time of year, and identify a correlation between backups taking place in Berlin and when the process in California is being performed. The business intelligence application 132 may then conclude that the observed slow response times in California are due to the backup process taking place at around the same time in Berlin. This result can be used by a system administrator to reschedule the backup activity in Berlin or the activity in California, or the administrator may consider upgrading the hardware (e.g., additional processors, memory, and so on).

The statistics server 112 may include a configuration file 114 to configure the activities of the statistics server. Configuration information can be input by the user 136 and stored in the configuration file 114. In embodiments, the configuration information can specify many aspects of the collection of performance data; the collection is highly configurable. The configuration information can specify what data to monitor and collect. The configuration information can specify a collection schedule for the statistics server 112. Since collection activities of the statistics server 112 draw on system resources of the in-memory computing system 100 (e.g., processor bandwidth, memory bandwidth), it may be desirable to schedule when the statistics server operates, for how long the statistics server operates, and how frequent the collections are performed. The configuration information can specify the format (e.g., data table schema) of output data generated by the statistics server 112. Being able to specify the output format can facilitate interfacing the output data with analytical tools (e.g., business intelligence analysis applications 132). The configuration information can include triggering information to specify the conditions for when an alert 118 is communicated to a user. More generally, the configuration information can specify performing actions in addition to or instead of sending alerts 118. The configuration information can specify rules for assessing the historic data collected by the statistics server 112. The configuration information can specify/define conditions and events, and the actions that should be taken when those conditions are met or when those events occur.

Figure 5:
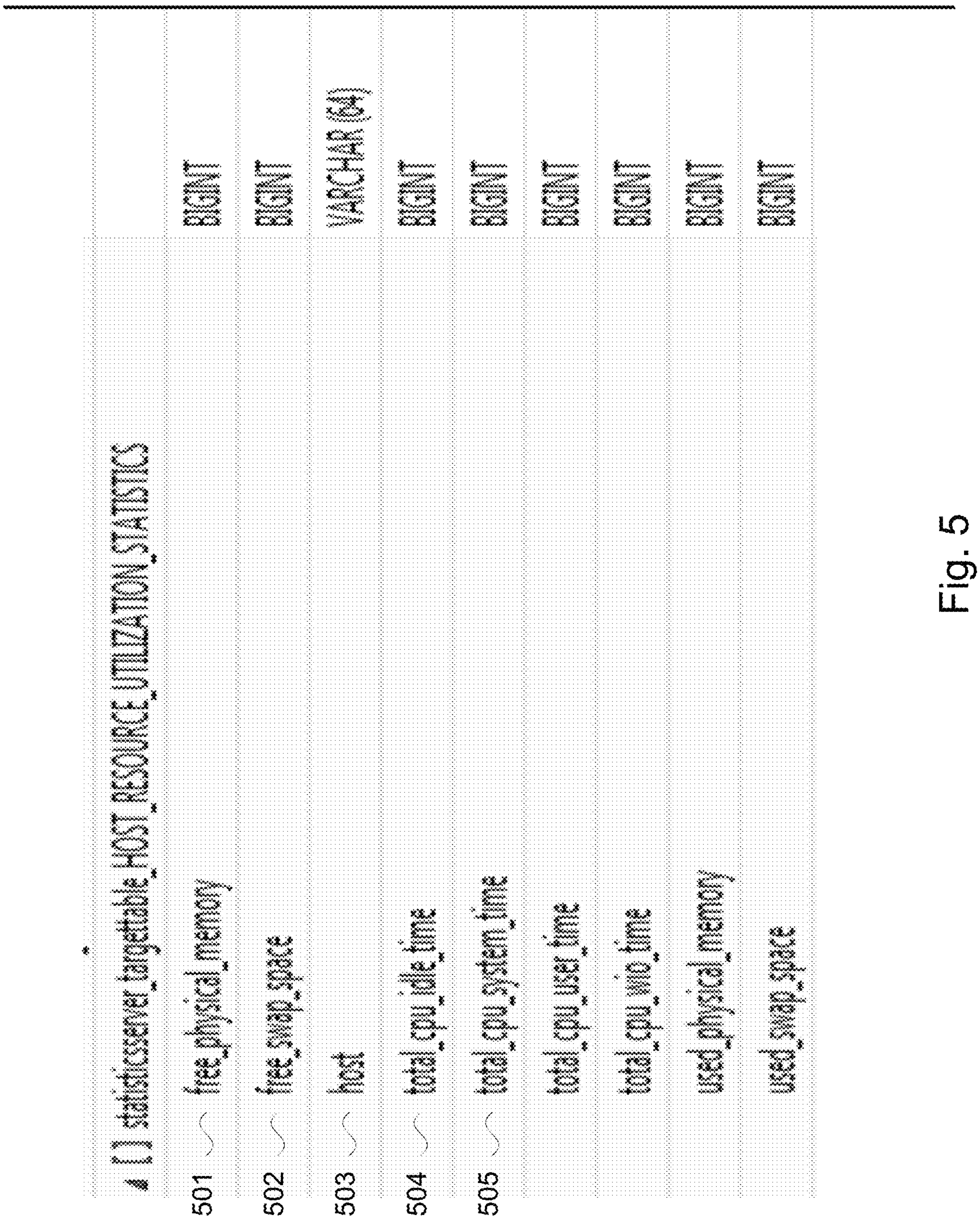
FIG. 5 shows an example of a data table definition in accordance with an embodiment.

FIG. 5 shows an illustrative example of a data table definition for a data table that can be stored in the statistics tenant 104*c* in accordance with an embodiment and filled in by the statistics server 112. In the particular example shown, the data table definition specifies a table to store utilization statistics for a host CPU. The data table definition specifies various data fields and their data types. FIG. 5A shows an example of an instantiation of a data table 500 defined by the data table definition shown in FIG. 5. Columns 501-505 are illustrated. Next will be a discussion of how the columns of the data table can be populated.

Figure 6:
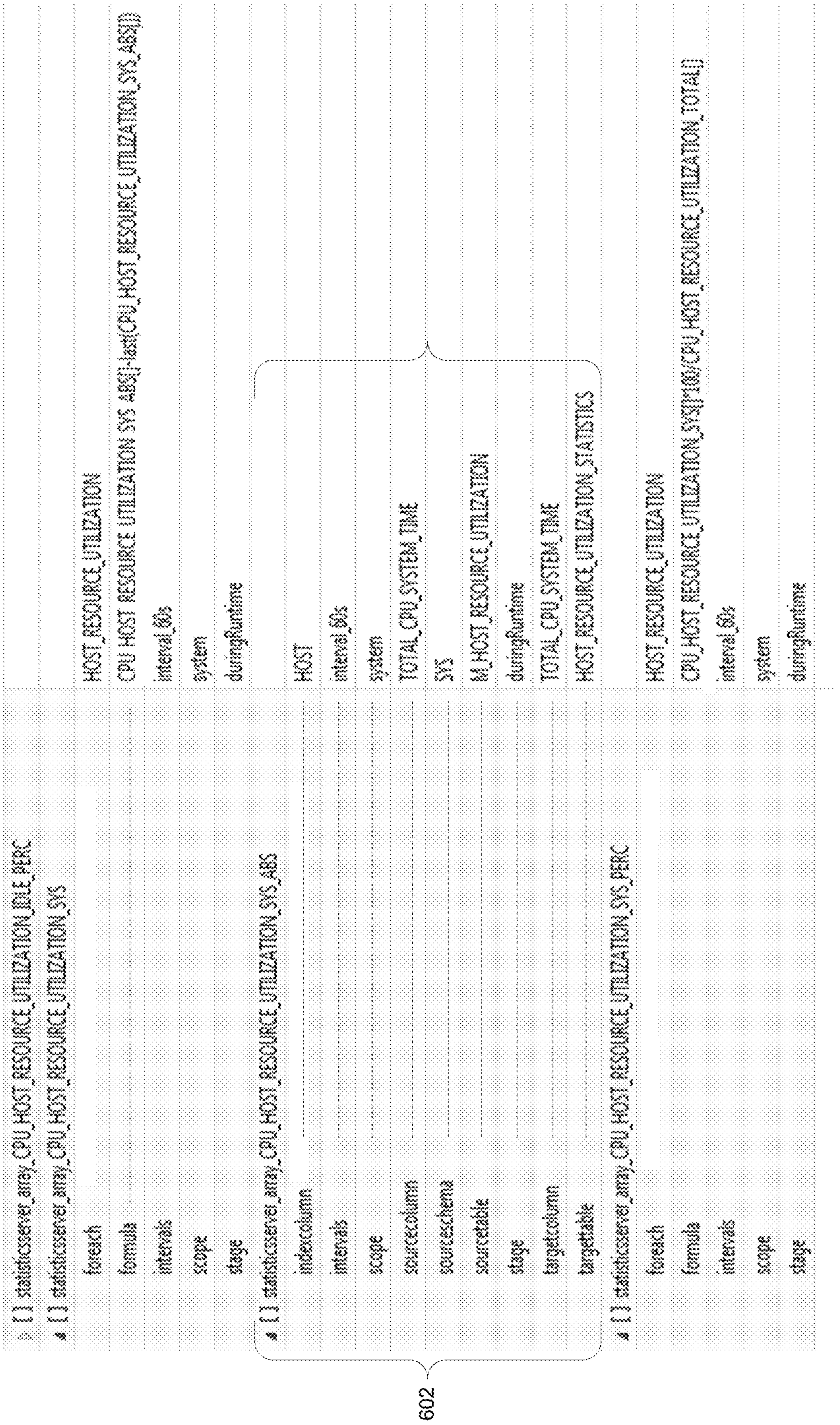
FIG. 6 is an example of an array definition in accordance with an embodiment.

Each of the columns 501-505 in the data table 500 is associated with an array definition. FIG. 6 shows an example of an array definition 602 that specifies how column 505 (target column) is populated. The array definition 602 includes an "indexcolumn" key which specifies which column in the data table 500 to index on. In the example, the index is on the HOST column 503. The "sourceschema", "sourcetable", and "sourcecolumn" keys in the array definition 602 identify which of the system tables 104*b* will serves as the source of data to populate the target column 505 in. In the example shown in FIG. 6, data from the system table SYS.M_HOST_RESOURCE_UTILIZATION is accessed, and in particular the data is contained in the column called TOTAL_CPU_SYSTEM_TIME. The array definition 602 further specifies that the target column 503 is updated every 60 seconds (see "intervals"). In this way, a history can be constructed.

Array definitions need not be used for populating columns in a target data table. For example, the array definition shown in FIG. 7 can be used to specify a trigger for an alarm. In embodiments, array definitions can include arithmetic and logic formulas. The illustrative array definition shown in FIG. 7 defines the criteria for an email alert. There is a "label" key which specifies the message to be included in the email. The array definition includes variables such as SHM_USED_SIZE and THRESHOLD_SHM_USED_SIZE_WARING_LEVEL_3 which are replaced at runtime by corresponding actual values when the message is incorporated in the body of an email. In this way, the email text is dynamic and can be configured with the specific conditions of the system that the email is intended to convey. An "emailcondition" key specifies an arithmetic expression as the criterion for sending the email alert. The value of the "name" key is sent in the email's subject field (it is just plain text). The value of the "description" key can be used in a suitable graphical user interface (GUI) to explain the meaning of the alert to the user. In embodiments, formulas can incorporate other array definitions; e.g., the "warning2" and "warning3" keys are specified using arithmetic expression that reference array definitions.

To further increase the speed and efficiency with system monitoring can be performed, the various monitoring operations on the data stored in the main memory 104 can be executed on the data without first removing it from the main memory 104. Accordingly, in some embodiments, operations on the data can be performed on the data in the main memory 104 while it is still in the main memory 104. Performing such operations on the data in memory can reduce the computing resource overhead by avoiding at least some read/write operations of data in and out of main memory 104, as well as alleviating the need for some inter-process communication and logic. At least some, if not all, of the various activities described above as operations performed by the statistics server 112 and/or processes 102 can be accomplished using logic embedded in query statements stored in and executed on data in the main memory 104. In one embodiment, a statistics scheduler process in the in-memory computer 100 can be used to invoke one or more of the query statements stored in the main memory 104.

In various embodiments of the present disclosure, simple and complex operations and/or logic can be implemented as collections of query statements that can include logical operators (e.g., OR, AND, NOT, ANY, etc.) stored in the main memory. The query statements can be structured query language (SQL) statements or commands. A set of SQL commands (e.g., an ordered or unordered list of several SQL commands) can be saved as an SQL script procedure. SQL script procedures can be saved in one or more systems tables in the database to which the SQL script procedure belongs.

While many example embodiments in the present disclosure are described in reference to what are commonly referred to as SQL commands and SQL scripts, one of ordinary skill in the art will recognize that other query and database languages can be used to generate commands that can be compiled into script procedures to implement various data editing and logic operations on data stored in tables in a database. Accordingly, the term script procedures can be used to refer to any collection of SQL and non-SQL commands stored in one or more tables in a database that can be executed to operate on data (i.e., move, copy, edit, update, delete, analyze, evaluate, etc.) while it is still in the database. For example, one script procedure can be executed to select and copy data from one database table in the main-memory component 104 to another database table without taking the data out of the main-memory component 104. Such embodiments potentially achieve the benefit of increasing the speed and efficiency with which the various operations defined in the script procedure can be performed on the data in the main memory 104.

As described herein, various monitoring operations begin with the statistics server 112, or another process 102, retrieving runtime information from the data stored in main memory 104. The statistics server 112 can retrieve runtime information from the system tables 104*b* directly or by querying one or more processes 102, which in response, access the appropriate system table(s) 104*b* to retrieve the runtime information out of the main memory 104. The statistics server 112 can then collect the runtime information for the various processes 102 by storing it back into the main memory 104. In some embodiments, when the data is stored back into the main memory 104 it is organized into tables in the statistics tenant 104*c*. However, reading data out of the main memory 104 just to write it back into the main memory 104 does require some finite amount of time and computing resources. Depending on the number and frequency of reads and writes out of and into the main memory, collecting runtime information can involve significant time and computing resources. Embodiments of the present disclosure can avoid such overhead by reducing or eliminating the need to read data out of one or more tables in the main memory just to write it back into another table in the main memory. Instead, such embodiments can perform the collection and analysis of runtime information, as well as the table updates/creation, without ever having to remove the runtime information from the main memory 104. Specific example embodiments of statistics services, with implementations that include at least one script procedure stored in the main memory 104, that can replace or enhance the performance of the statistics server 118 are described in more detail in references to FIGS. 8 through 10.

Figure 8:
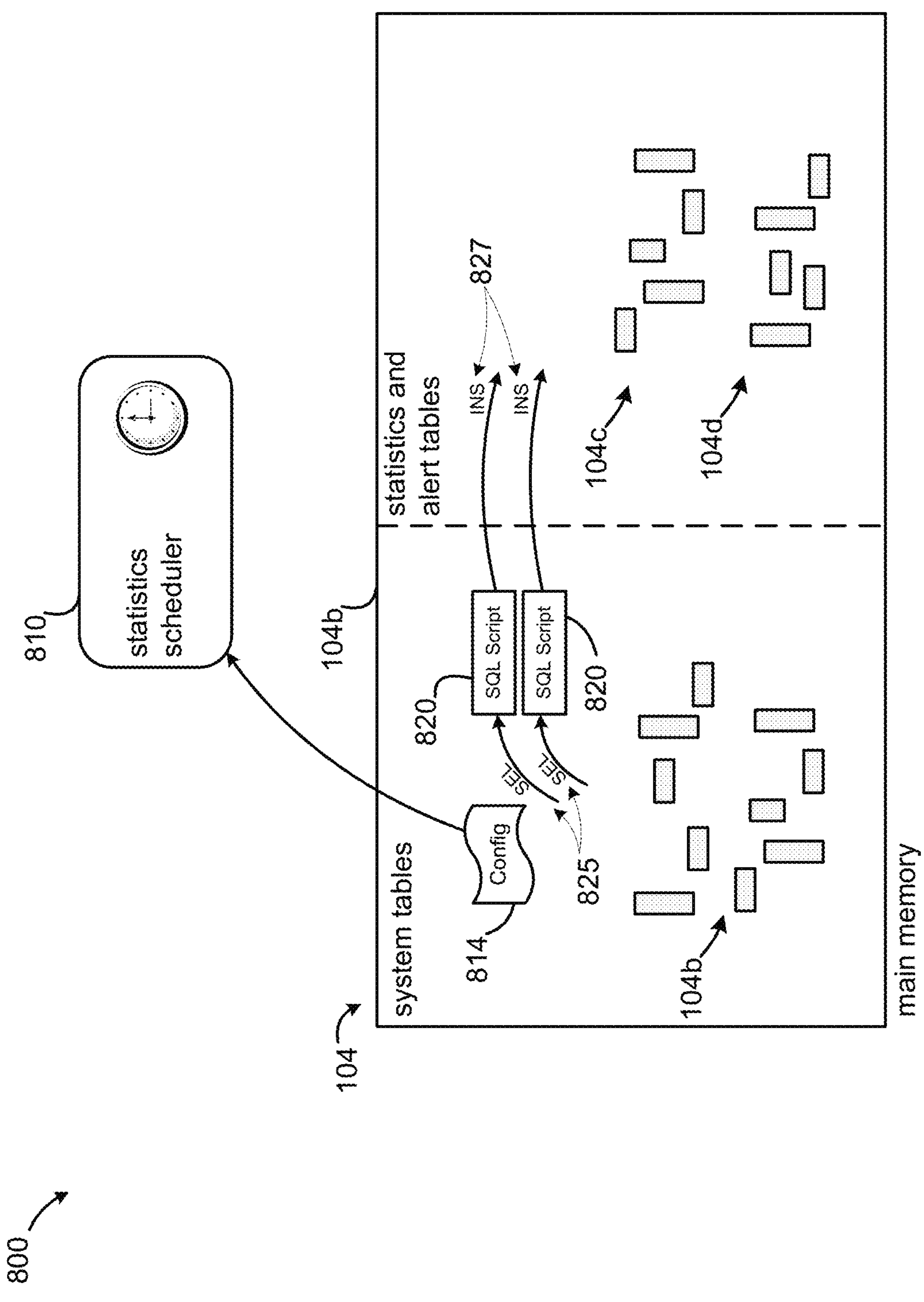
FIG. 8 represents a high-level diagram of a statistics service in accordance with the present disclosure.

FIG. 8 illustrates a high level block diagram of a statistics service 800 that can perform data collection and analysis operations on data while it is still resident in the main memory 104 (FIG. 1). In some embodiments, the statistics service 800 can replace the separate statistics server process 112 to further reduce the overhead associated with various system monitoring functionality described herein. In one embodiment, statistics service 800 can be implemented using a statistics scheduler process 810 and a number of scripts procedures, depicted here as SQL scripts 820, stored in the main memory 104. Based on information and settings in the configuration file 114, the statistics scheduler 810 can cause one or more SQL scripts 820 to execute in the main memory 104. For example, one SQL script 820 can include one or more select commands (SEL) 825 to perform the necessary runtime data collection and analysis on the data in the system tables 104*b* on a periodic, or otherwise scheduled, basis. Another or the same SQL script 820 can include insert commands (INS) 827 to store the collected and/or analyzed runtime data into one or more tables in the statistics tenant 104*c* and/or the alerts table 104*d*. Accordingly, in such embodiments, none of the runtime data need ever come out of the database in the main memory 104 during the collection, analytical, or storing processes.

In various embodiments, an SQL script 820 can include a set of SQL commands saved in a database in the main memory 104. In one embodiment, the SQL script 820 can be saved in the database as metadata and exposed to other components of the in-memory computer system 100 as catalog views. In another embodiment, the SQL script 820 can be stored in the database in a set of system tables 104*b*. The SQL script 820 can be accessed using dedicated editors, commands, and syntax implemented specifically to alter the scripts. For example, an SQL script 820 can contain one or more SQL commands. An editing program in one or more of the business application 134, business intelligence analysis application 132, or editing tools in an monitoring infrastructure can create, edit, view, run, and delete SQL commands in the script files. Execution of individual SQL commands can be independent of the execution of the SQL scripts 820 in the main memory 104.

To organize the historization of data, whenever the statistics scheduler 810 initiates a particular SQL script 820, a time indicator can be associated with the resulting data. For example, the data collected from or alert data generated from the system tables 104*b* can be associated with one or more timestamps (e.g., a start time and an end time) that indicate a time of day and/or a date. The timestamps can then be used to determine and organize a historical account of the runtime and/or alert data. In embodiments, the timestamps can be included in a row of a statistics table 104*c* along with the corresponding collected runtime data or in a row of an alert table 104*d* along with the generated alert data.

In some embodiments, data resulting from the execution of an SQL script 820 (i.e., collected runtime data or alert data) can be associated with an SQL script identifier that identifies the SQL script 820. In addition, the SQL script identifier and any resulting data associated with the execution of the SQL script 820 on data in the main memory 104 can be stored with the associated timestamp. The time stamps can include an indication of the time at which a particular SQL statement or SQL script started, and/or ended. Accordingly, the start time and/or the end time can be used to determine various time characteristics. For example, the difference between the start time and the end time can interpreted as the amount of time it took for the particular SQL script 820 to execute in that particular instance. Alternatively, the time stamp can be used alone or in combination with other data to evaluate and/or generate a historical view of the collected or analyzed data.

As described herein, processes 102 can store runtime information relating to the on-line transaction processing and on-line analytical processing stored in system tables 104*b*. Such information can also include time indicators, such as timestamps, to provide a time frame with which to evaluate the historical performance of corresponding processes 102. One or more SQL scripts 820 can be executed in the main memory 104 to select specific runtime information from the system tables 104*b*. The selection of the runtime information from the system tables 104*b* can be based on a selection of a range of time indicators. The range of time indicators can be hardcoded in the SQL script 820 or be based on user preferences or system settings stored in the configuration file 814. The same or different SQL scripts 820 can then be executed to store the selected runtime information as monitoring data in statistics tables 104*c*. Again, the same or different SQL scripts 820 can be executed on the data in the statistics tables 104*c* to generate system performance metrics. The resulting system performance metrics can then be stored in one or more statistics tables 104*c*, or other tables in the main memory 104, according to a corresponding SQL script 820. Over time, the SQL scripts 820 can generate and collect a history of monitoring data and performance metrics in the statistics tables 104*c*.

The collection of runtime data about the various processes 102 and/or the system performance metrics can be used to collect a history of system performance. The insertion of the collected runtime data and/or the system performance metrics into one or more tables in the statistics tenant 104*c* to develop a history of runtime data can include executing one or more SQL scripts 820 to select, analyze, and insert runtime data from one or more of the system tables 104*b* into one or more measurement tables in the statistics tenant 104*c* as monitoring data. In such embodiments, runtime data is copied from a system table 104*b* to a table in the statistics tenant 104*c* (e.g., a statistics table). In some embodiments, the runtime data can include analyzed data, such as the calculated system performance metrics.

For example, the SQL scripts 820 can be used to populate column 505 in the table illustrated in FIG. 5A according to the following SQL statement:

```
INSERT INTO HOST_RESOURCE_UTILIZATION
[TOTAL_CPU_SYSTEM_TIME]
SELECT HOST_RESOURCE_UTILIZATION
FROM M_HOST_RESOUCE_UTILIZATION;
```

In some embodiments, one or more of the SQL scripts 820 can include logic for evaluating the runtime data or a system performance metric to determine whether it should be stored in one or more alerts tables 104*d*. Such logic can be implemented as one or more SQL commands comprising one or more logical operators (e.g., OR, AND, and NOT) to evaluate the monitoring data or metric with one or more predetermined alert conditions. The logic implemented in an SQL script 820 can compare conditions to determine whether a particular entry in a system table 104*b*, or a corresponding alert, should be inserted into an alerts table 104*d*. For example, the following SQL statement can be used to evaluate the condition wherein the host resource utilization is greater than or equal to a particular threshold or NULL to determine whether to insert an alert into the host resource utilization alert table:

```
INSERT INTO HOST_RESOURCE_UTILIZATION_
  ALERT
[ALERT_EVENT]
SELECT HOST_RESOURCE_UTILIZATION
FROM M_HOST_RESOUCE_UTILIZATION
WHERE HOST_RESOURCE_UTILIZATION >=
HOST_RESOURCE_UTILIZATION_THRESHOLD
  OR
HOST_RESOURCE_UTILIZATION=NULL
```

In embodiments, the SQL scripts 820 used for selecting and copying runtime data from the system stables 104*b* into one or more history tables in the statistics tenant 104*c* can be separate from other SQL scripts 820 used for evaluating runtime data for entry into alerts tables 104*d*. Accordingly, SQL scripts 820 used for collecting runtime data and SQL scripts 820 used for evaluating alert conditions in the runtime data can be edited independently of each other, thus giving users flexibility to change the runtime data collection processes without changing or potentially causing errors in the alert determination processes. Similarly, changes to the alert determination processes can be made without altering the runtime data collection processes. Such features of the present disclosure potentially give users enhanced flexibility to implement custom data collection and alert processing without the need to change or recompile code for the statistics server 112.

In some embodiments, once sufficient historical monitoring data and/or performance metrics are collected, one or more SQL scripts 820 can be executed on the data in the statistic tables 104*c* to evaluate various alert conditions. For example, one particular SQL script 820 may be executed on the historical memory usage data stored in a statistics table that corresponds to a particular process 102. Such an SQL script 820 may evaluate the rate at which the memory usage of the particular process 102 changes with respect to time. If memory usage change rate is below or above a threshold rate defined in the SQL script 820 or in configuration file 814, an alert condition can be written to one or more alert tables 104*d*. In one embodiment, sufficient historical monitoring data can be a few as one record stored in the statistics tables 104*c*. In another embodiment, sufficient historical monitoring data can include one or more records stored in the statistics tables 104*c*.

Figure 9:
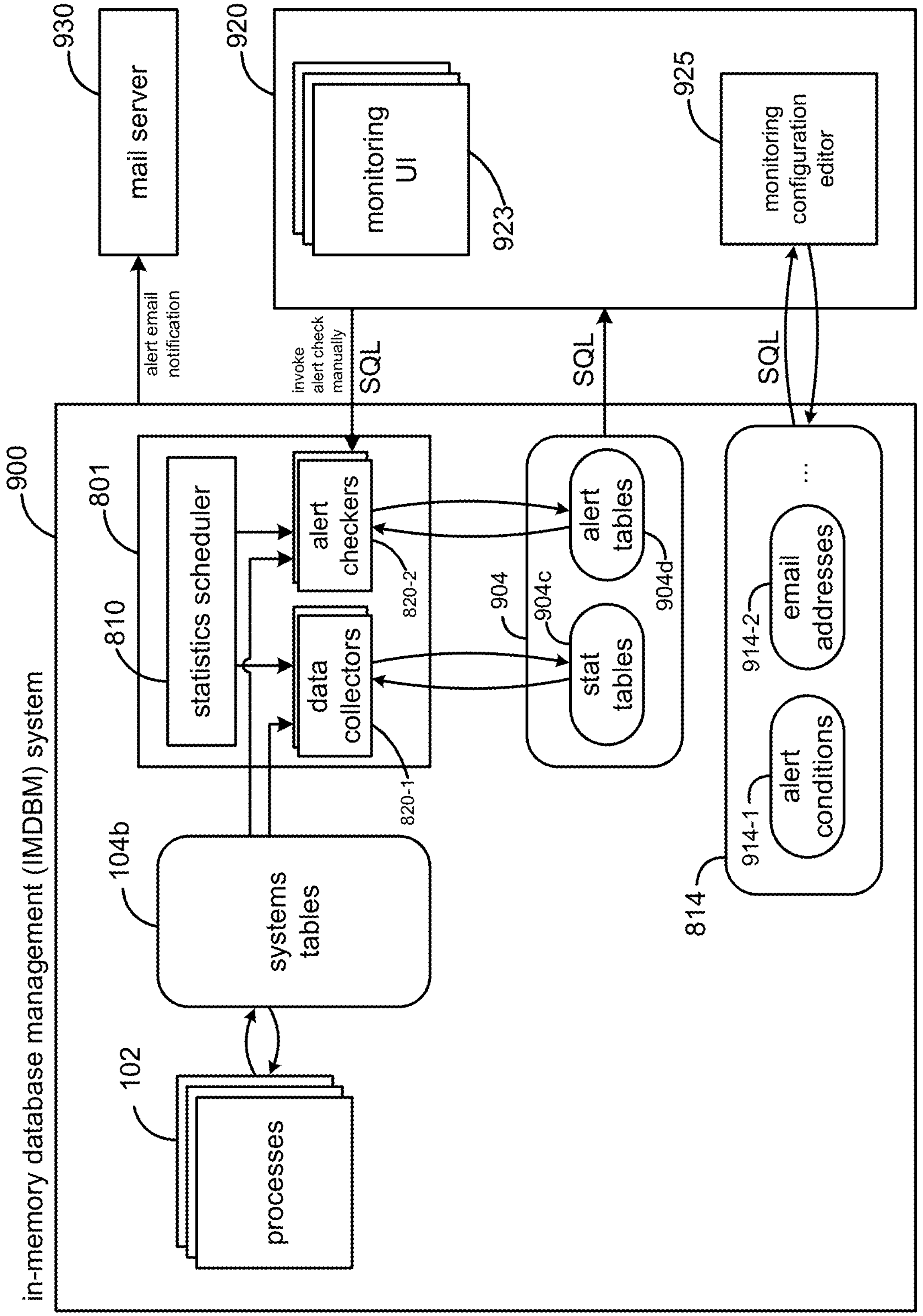
FIG. 9 is a block diagram of an example in-memory computing system in accordance with the present disclosure.

FIG. 9 is a schematic diagram of a specific example in-memory database management (IMDBM) system 900 that implements the statistics service 801, in accordance with various embodiments of the present disclosure. The statistics service 801, can collect and evaluate information about status, performance, and resource consumption from all components or processes 102 in the IMDBM system 900. In one embodiment, the statistics service 801 can be implemented as SQL scripts 820 and a statistics scheduler 810. The tables 904 and SQL scripts 820 can be resident in a master index server (not shown). The statistics scheduler 810 can be a thread running on a master name server (also not shown). In the particular example shown in FIG. 9, the SQL scripts 820-1 and 820-2 collect data and evaluate alert conditions. Accordingly, the SQL scripts 820-1 and 820-2 are referred to herein as "data collectors" and "alert checkers", respectively.

In one embodiment, the data collectors 820-1 and the alert checkers 820-2 can be invoked by the statistics scheduler 810 according to predetermined settings that can be stored in the configuration file 814. In addition, the data collectors 820-1 and the alert checkers 820-2 can be invoked manually by a user through the monitoring infrastructure system 920.

The data collectors 820-1 can read runtime data from the system tables 104*b*, process the data, and store the processed data in the statistics tables 904*c*, thus creating a runtime data measurement history. As discussed herein, the tables 904, including the statistics tables 904*c* and alert tables 904*d*, can be resident in a main memory 104.

The alert checkers 820-2 can be scheduled in conjunction with or independently from the data collectors 820-1, and can also read runtime data from the system tables 104*b*. While the alert checkers 820-2 are shown as reading runtime data directly from the system tables 104*b* and not from the statistics tables 904*c*, in embodiments, the alert checkers 820-2 can also read data from the statistics tables 904*c*. Once the alert checkers 820-2 obtain the runtime data, the alert checkers 820-2 can be further executed to evaluate one or more alert conditions 914-1. Evaluation of an alert condition can include collecting runtime data or calculating a value from runtime data from the systems tables 104*b* and comparing it against one or more alert condition definitions in alert conditions 914-1.

Alert conditions 914-1 can include one or more alert condition definitions that define one or more threshold values or status flags that indicate one or more conditions in the in-memory computer system 100 or application 132 or 134. The alert conditions 914-1 can include both default and customized alert condition definitions. For example, a custom alert condition definition can be defined by a particular user (e.g., a system administrator) to monitor runtime data associated with a particular problematic process (e.g., one of the OLAP servers 102 that has been causing memory bloat in the data tables 104*a*) to which a recent fix or software patch has been applied. In such an example, the custom alert condition definition can include a threshold value for the rate at which data can be added to the data tables. In contrast, default alert condition definitions can include specifications for thresholds or status flags that can be used to evaluate alert conditions in any of the processes 102 or in the in-memory computer system 100.

If an alert condition is detected, then a corresponding alert (e.g., detail of the alert) can be written to the alert tables 904*d*. Alerts written to one or more alert tables 904*d* can be accessed by monitoring tools in the monitoring infrastructure system 920, such as monitoring UI 923, to generate an alert status message. In such embodiments, the monitoring infrastructure system 920 can access the data in the statistics tables 904*c* or alert tables 904*d* using SQL statements.

In other embodiments, when an alert condition is detected or when an alert is written to alert tables 904*d*, the alert checkers 820-2, or some other component of IMDBM system 900, can initiate a command to an external or integrated mail server 930 to send an alert message to one or more users (e.g., system administrators) to inform them of the alert condition according to settings in the email addresses 914-2 and alert conditions 914-1. The content and priority of the alert message (e.g., email or short message service (SMS)), as well as the email addresses or telephone number to which the alert message should be sent, can be defined in the alert conditions 914-1 and email addresses 914-2. Accordingly, based on the alert condition detected, certain users, as identified by their associated email addresses or telephone numbers, can be included as recipients of the alert message.

For example, alert conditions that identify issues with the IMDBM system 900 as a whole may be sent to one or more high level system administrators to increase the likelihood of an immediate resolution. In contrast, for alert conditions that affect only isolated processes 102, an alert email can be sent to the individual technician who is responsible for that particular process. Similarly, depending on the severity, sensitivity, or security level of the alert condition detected, the alert checkers 820-2 can include or exclude the specifics about the alert condition detected or determined by the corresponding alert checker 820-2. If the alert condition persists after an alert email is initiated, then the alert conditions 914-1 and the email addresses 914-2 can specify that additional email messages be sent. The additional email may include escalating the priority of the email, including higher level or additional users as recipients of the alert email, or including additional summary information about the alert condition. In some embodiments, the frequency with which the alert emails are initiated can also be increased.

In one embodiment, the alert conditions 914-1, email addresses 914-2, the frequency with which the statistics scheduler 810 invokes data collectors 820-1 and/or alert checkers 820-2, and other settings of the IMDBM system 900, can be edited by the monitoring configuration editor 925 in response to user input received through the monitoring infrastructure system 920.

Any interactions between the monitoring infrastructure system 920 and the IMDBM system 900 can be conducted using one or more SQL statements. For example, when an administrator receives an alert email from the IMDBM system 900, the administrator can log into the monitoring infrastructure system 920. Using one or more tools, such as the monitoring UI 923, the administrator can view the details of the alert condition by manually accessing the alert tables 904*d* or invoking the corresponding alert checkers 820-2 to access the alert tables 904*d* to evaluate the status of the alert condition. The administrator can evaluate the efficacy of various adjustments or fixes by invoking the alert checkers 820-2 to confirm that the alert condition either persists or has been cleared.

Figure 10:
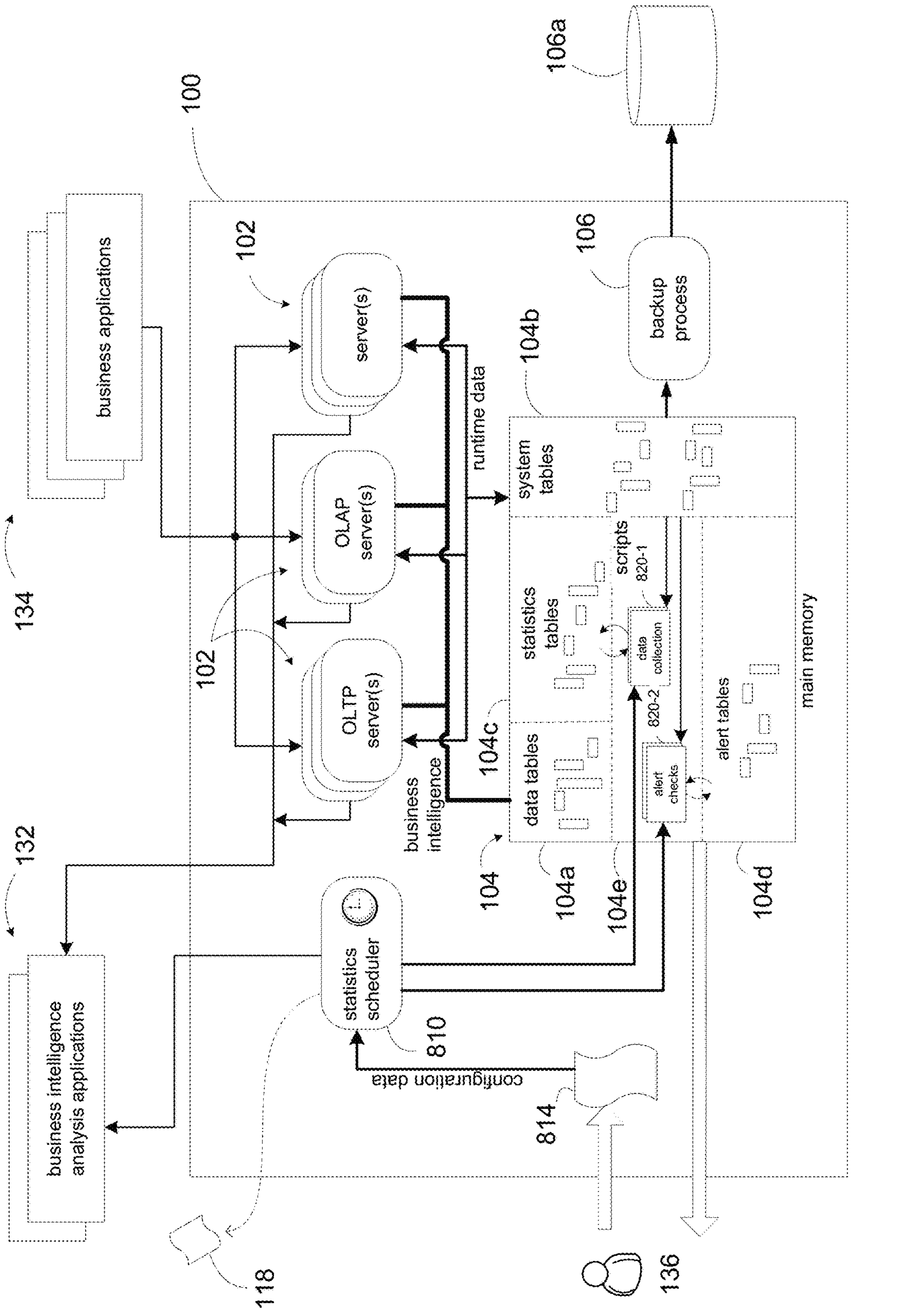
FIG. 10 is a block diagram of an example implementation of an in-memory computing system with statistics service system monitoring in accordance with the present disclosure.

FIG. 10 is a schematic diagram that illustrates how statistics services, such as 800 or 801 described in reference to FIGS. 8 and 9 respectively, can replace the statistics server 112 in an in-memory computing system 100 for monitoring runtime data of the various processes 102 in accordance with the present disclosure. As shown, the statistics server 112 can be omitted, thus removing one sever process 102, which can improve the performance of the in-memory computing system 100. The statistics service can be implemented as a statistics scheduler thread 810, a configuration file 814, and a collection 104*e* of scripts, also referred to herein as script procedures, 820 resident in the main memory 104.

As shown, the user 136 can define the configuration file 814. As described herein, the configuration file 814 can include listings of specific SQL scripts 820 that should be executed in the main memory 104 to perform the corresponding data collection and alert condition evaluation processes. The configuration file 814 can also include corresponding frequencies with which each one of the SQL scripts 820 should be executed. For example, the configuration file 814 may include the specification of a particular SQL script 820 be executed to gather runtime information regarding the OLTP servers and OLAP servers 102 from the statistics tenant 104*c* every 60 seconds.

The implementation of the in-memory computing system 100 that includes a statistics service instead of a statistics server 112 allows for various performance improvements. One example improvement afforded by the use of an embodiment of the statistics service in an in-memory computing system 100 with a single index server, comprises the ability to copy data from systems tables 104*b* to statistics tables 104*c* or alert tables 104*d* with little or no inter-process communication. Most of the in-memory data handling can be handled by one or more of the scripts 820 already in the main memory 104 (e.g., data collectors 820-1 and alert checkers 820-2). This decreases the time and computing resource required to perform data collection, historization, and alert condition checking, thus increasing the efficiency and stability of the in-memory computer system 100.

Figure 11:
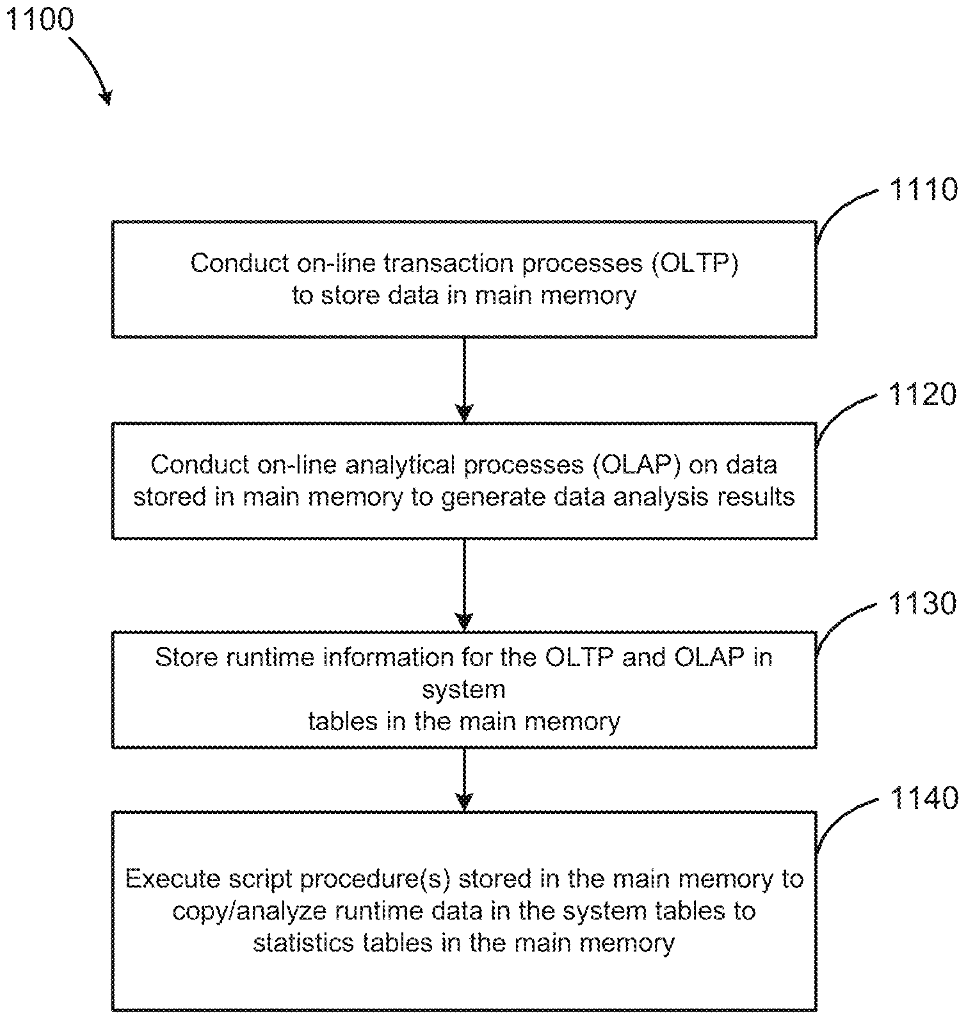
FIG. 11 is a flowchart of a method for monitoring an in-memory computer system in accordance with the present disclosure.

FIG. 11 is a flow chart of a method 1100 for performing various system monitoring operations of an in-memory computer system, according to embodiments of the present disclosure. The method 1100 can begin at box 1110 in which one or more processing units in an in-memory computer system 100 can conduct various OLTP operations in one or more OLTP server processes 102. As described herein, the OLTP server processes 102 can store data, typically transaction data, in one or more data tables 104*a* in the main memory 104 of the in-memory computing system 100.

In box 1120, one or more of the processing units can perform various OLAP operations in one or more OLAP server processes 102. The OLAP server processes 102 can operate on the data stored in the data tables 104*a* in the main memory to generate data analysis results. As the OLTP and OLAP server processes 102 perform their respective operations, the in-memory computing system 100 can determine runtime information about each of the server processes 102 and/or the operating system of the in-memory computing system 100. In some embodiments, the runtime information can include state information regarding the OLTP and/or OLAP operations. At box 1130, the in-memory computer system 100 can store the runtime information in the main memory 104. For example, the runtime information can be stored in one or more of the system tables 104*b*.

In box 1140 the in-memory computer system can invoke one or more script procedures stored in the main memory 104. In one embodiment, the script procedures, such as SQL scripts 820, can be stored in one or more tables (e.g., system tables 104*b* or scripts tables 104*e*) in the main memory 104. The in-memory computer system 100 can then invoke one or more of the script procedures to operate on the runtime information stored in the main memory 104. In one embodiment, one script procedure can be invoked to select runtime information from one of the system tables 104*b* and copy it to a statistics table 104*c*. For example, a particular SQL script can be invoked to select and gather runtime information for a particular server process 102 stored in a corresponding system table 104*b* and copy it as monitoring data to one or more statistics tables 104*c*. In other embodiments, the same or a different SQL script 820 can be invoked to analyze the selected runtime information. The analysis of the runtime information can include generating system performance metrics and storing it in one of the statistics tables 104*c*. In some embodiments, the SQL script may also compare the monitoring data or the performance metrics against one or more alert condition definitions. In such embodiments, the logic for analyzing the monitoring data to generate system performance metrics or comparing it according to an alert condition definition can be implemented in the SQL script 820 as logical operators included in one or more of the component SQL commands. The results of the analysis can then be stored in the statistics tables 104*c*. In embodiments, when an alert condition is detected in the monitoring data or the system performance metrics, an alert can be stored to one or more alerts tables 104*d* in the main memory. In one embodiment, actions performed at box 1140 can be achieved without any of the runtime or monitoring data being taken out of the main memory 104.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A computer-implemented method of monitoring system performance of an in-memory computer system, the method comprising:

executing, by the in-memory computer system, a plurality of on-line transaction processes (OLTPs), wherein executing the plurality of OLTPs includes:

receiving runtime data, and storing the runtime data in a main memory component of the in-memory computer system for runtime data collection processes;

executing, by the in-memory computer system, a plurality of on-line analytical processes (OLAPs) on the same runtime data for runtime data analysis processes, wherein executing the plurality of OLAPs produces a plurality of runtime data analysis results;

storing, by the in-memory computer system, the runtime data in a plurality of system tables in the main memory component;

performing, by the in-memory computer system, the runtime data collection processes and the runtime data analysis processes in accordance with a statistics scheduler process, wherein performing the runtime data collection processes and the runtime data analysis processes includes copying at least some of the runtime data from one or more of the plurality of system tables to one or more of a plurality of statistics tables in the main memory as monitoring data;

evaluating, by the in-memory computer system, the plurality of runtime data analysis results; and adjusting a performance of the in-memory computer system as a result of evaluating the plurality of runtime data analysis results, wherein adjusting the performance of the in-memory computer system includes upgrading hardware of the in-memory computer system.

2. The computer-implemented method of claim 1, wherein the runtime data collection processes are adapted to be edited independently of the runtime data analysis processes.

3. The computer-implemented method of claim 1, further comprising:

performing, by the in-memory computer system, one or more predetermined data analyses on the monitoring data, wherein performing the one or more predetermined data analyses includes producing a plurality of system performance metrics; and receiving, by the in-memory computer system from a business intelligence tool, one or more requests for some of the system performance metrics.

4. The computer-implemented method of claim 1, wherein the monitoring data is used for evaluating a historical performance of the in-memory computer system.

5. The computer-implemented method of claim 1, wherein the monitoring data includes time indicators for evaluating a historical performance.

6. The computer-implemented method of claim 1, wherein the monitoring data includes time indicators for evaluating a historical performance of the plurality of OLTPs and the plurality of OLAPs.

7. The computer-implemented method of claim 1, wherein the runtime data results from executing the plurality of OLTPs.

8. The computer-implemented method of claim 1, wherein a given OLTP of the plurality of OLTPs results in a subset of the runtime data, wherein the subset of the runtime data is associated with an identifier that identifies the given OLTP.

9. An apparatus comprising an in-memory computing system, the in-memory computing system comprising:

a plurality of server subsystems;

a main memory subsystem in data communication with the plurality of server subsystems and having stored thereon one or more system tables and one or more statistics tables;

a scheduler subsystem in data communication with the main memory subsystem;

a disk storage subsystem; and computer executable instructions stored among the main memory subsystem and the disk storage subsystem, wherein the computer executable instructions are configured to cause the plurality of server subsystems to:

execute a plurality of on-line transaction processes (OLTPs), wherein executing the plurality of OLTPs includes:

receiving runtime data, and storing the runtime data in a main memory component of the in-memory computer system for runtime data collection processes;

execute a plurality of on-line analytical processes (OLAPs) on the same runtime data for runtime data analysis processes, wherein executing the plurality of OLAPs produces a plurality of runtime data analysis results; and store the runtime data in a plurality of system tables in the main memory component;

wherein the computer executable instructions are configured to cause the scheduler subsystem to:

perform the runtime data collection processes and the runtime data analysis processes in accordance with a statistics scheduler process, wherein performing the runtime data collection processes and the runtime data analysis processes includes copying at least some of the runtime data from one or more of the plurality of system tables to one or more of a plurality of statistics tables in the main memory as monitoring data;

evaluate the plurality of runtime data analysis results; and adjust a performance of the in-memory computer system as a result of evaluating the plurality of runtime data analysis results, wherein adjusting the performance of the in-memory computer system includes upgrading hardware of the in-memory computer system.

10. The apparatus of claim 9, wherein the runtime data collection processes are adapted to be edited independently of the runtime data analysis processes.

11. The apparatus of claim 9, wherein the computer executable instructions are configured to cause the scheduler subsystem further to:

perform one or more predetermined data analyses on the monitoring data, wherein performing the one or more predetermined data analyses includes producing a plurality of system performance metrics; and receive, from a business intelligence tool, one or more requests for some of the system performance metrics.

12. The apparatus of claim 9, wherein the monitoring data is used for evaluating a historical performance of the in-memory computer system.

13. The apparatus of claim 9, wherein the monitoring data includes time indicators for evaluating a historical performance.

14. The apparatus of claim 9, wherein the monitoring data includes time indicators for evaluating a historical performance of the plurality of OLTPs and the plurality of OLAPs.

15. The apparatus of claim 9, wherein the runtime data results from executing the plurality of OLTPs.

16. The apparatus of claim 9, wherein a given OLTP of the plurality of OLTPs results in a subset of the runtime data, wherein the subset of the runtime data is associated with an identifier that identifies the given OLTP.

17. A non-transitory computer readable storage medium having stored thereon computer executable instructions that, when executed, cause one or more data processing units of an in-memory computer system to perform a method comprising:

executing, by the in-memory computer system, a plurality of on-line transaction processes (OLTPs), wherein executing the plurality of OLTPs includes:

receiving runtime data, and storing the runtime data in a main memory component of the in-memory computer system for runtime data collection processes;

executing, by the in-memory computer system, a plurality of on-line analytical processes (OLAPs) on the same runtime data for runtime data analysis processes, wherein executing the plurality of OLAPs produces a plurality of runtime data analysis results;

storing, by the in-memory computer system, the runtime data in a plurality of system tables in the main memory component;

performing, by the in-memory computer system, the runtime data collection processes and the runtime data analysis processes in accordance with a statistics scheduler process, wherein performing the runtime data collection processes and the runtime data analysis processes includes copying at least some of the runtime data from one or more of the plurality of system tables to one or more of a plurality of statistics tables in the main memory as monitoring data;

evaluating, by the in-memory computer system, the plurality of runtime data analysis results; and adjusting a performance of the in-memory computer system as a result of evaluating the plurality of runtime data analysis results, wherein adjusting the performance of the in-memory computer system includes upgrading hardware of the in-memory computer system.

18. The computer-implemented method of claim 1, wherein upgrading the hardware of the in-memory computer system includes adding a processor to the in-memory computer system.

19. The computer-implemented method of claim 1, wherein upgrading the hardware of the in-memory computer system includes adding memory to the in-memory computer system.

20. The computer-implemented method of claim 1, wherein upgrading the hardware of the in-memory computer system includes adding processors and memory to the in-memory computer system.

* * * * *